United States Patent [19]

Walles

[11] 3,824,762
[45] July 23, 1974

[54] APPARATUS FOR FILLING AND HERMETICALLY SEALING THERMOPLASTIC CONTAINERS UNDER VACUUM

[75] Inventor: Wilhelm E. Walles, Midland, Mich.
[73] Assignee: The Dow Chemical Company, Midland, Mich.
[22] Filed: Mar. 30, 1973
[21] Appl. No.: 346,444

[52] U.S. Cl. .................................................. 53/88
[51] Int. Cl. ......................................... B65b 31/02
[58] Field of Search ..................................... 53/88

[56] References Cited
UNITED STATES PATENTS
2,958,170   11/1960   Mayer ............................... 53/88 X
3,516,224   6/1970   Caccini ............................. 53/88 X Primary Examiner—Travis S. McGehee
Attorney, Agent, or Firm—R. G. Waterman; M. S. Jenkins

[57] ABSTRACT

Thermoplastic containers are filled with materials such as particulate solids or liquids under vacuum and hermetically sealed in rapid succession by an apparatus having means for evacuating the container, means for filling and hermetically sealing the evacuated containers while retaining the vacuum.

5 Claims, 2 Drawing Figures

APPARATUS FOR FILLING AND HERMETICALLY SEALING THERMOPLASTIC CONTAINERS UNDER VACUUM

BACKGROUND OF THE INVENTION

This invention relates to apparatus for filling plastic containers under vacuum and hermetically sealing the containers.

Recently, there have been devised thermoplastic polymers and laminate structures including such polymers which are substantially impermeable to the gases of the atmosphere. Accordingly, it is now possible to make containers of such materials which, after evacuation, can retain a vacuum for a substantial period of time. In many applications, it is desirable to package or otherwise enclose certain materials in such vacuumized plastic containers so that the packaged or enclosed material remains under vacuum. Heretofore, apparatus and methods for rapidly packaging or enclosing materials in vacuumized plastic containers have not been readily available to the art.

SUMMARY OF THE INVENTION

In accordance with the present invention, rapid, repetitive packaging or enclosing materials under vacuum is accomplished using the apparatus as described hereinafter. The apparatus comprises
1. a body defining a chamber and having an outlet and an inlet in communication with said chamber and an aperture at one end of body for receiving at least the portion of the container having an open end through which the container is to be filled with material, said open end being in communication through said aperture with said chamber;
2. a reciprocating valve assembly for opening and closing said inlet and outlet in sequence, said valve assembly being slidably disposed lengthwise within said chamber and comprising (a) a piston having a passageway disposed therein communicating between the end of the piston nearest said aperture and the inside sidewall of said body and (b) a shaft connecting said piston to a drive means;
3. an evacuating means in communication through a first conduit with the outlet in the chamber;
4. a receptacle holding the material under vacuum in communication through a second conduit with said inlet into the chamber; and
5. a means for sealing the container located in the chamber proximate to said aperture.

In operation of the apparatus, while maintaining said material under vaccum at all times, the open end of the container is placed into the aperture. Communication between the passageway disposed in the piston and the evacuating means is established. In this regard, it should be recognized that the piston may be moved to open communication, or the position of the piston at the beginning of the operation may be such that communication between the passageway and evacuating means exists. However, in any case in order to maintain the material to be placed in the container under vacuum throughout the operation, communication between the receptacle and chamber is closed before and during evacuation. Following evacuation, the piston is moved until the communication between the passageway and the evacuating means is terminated and communication between said second conduit and the open end of the container is opened. A desired amount of the material is conveyed into the evacuated container. The piston is moved to terminate communication between the second conduit and the container. The container is hermetically sealed by activating the sealing means. The finished container is then removed from the chamber. The apparatus is useful in filling under vacuum such containers as plastic vacuum bottles, food containers and the like.

BRIEF DESCRIPTION OF THE DRAWINGS

In the drawings, various forms of the invention are shown, but it is to be understood that the invention is not limited to such forms since the invention as set forth in the claims may be embodied in a plurality of forms.

DESCRIPTION OF THE PREFERRED EMBODIMENTS

Figure 1:
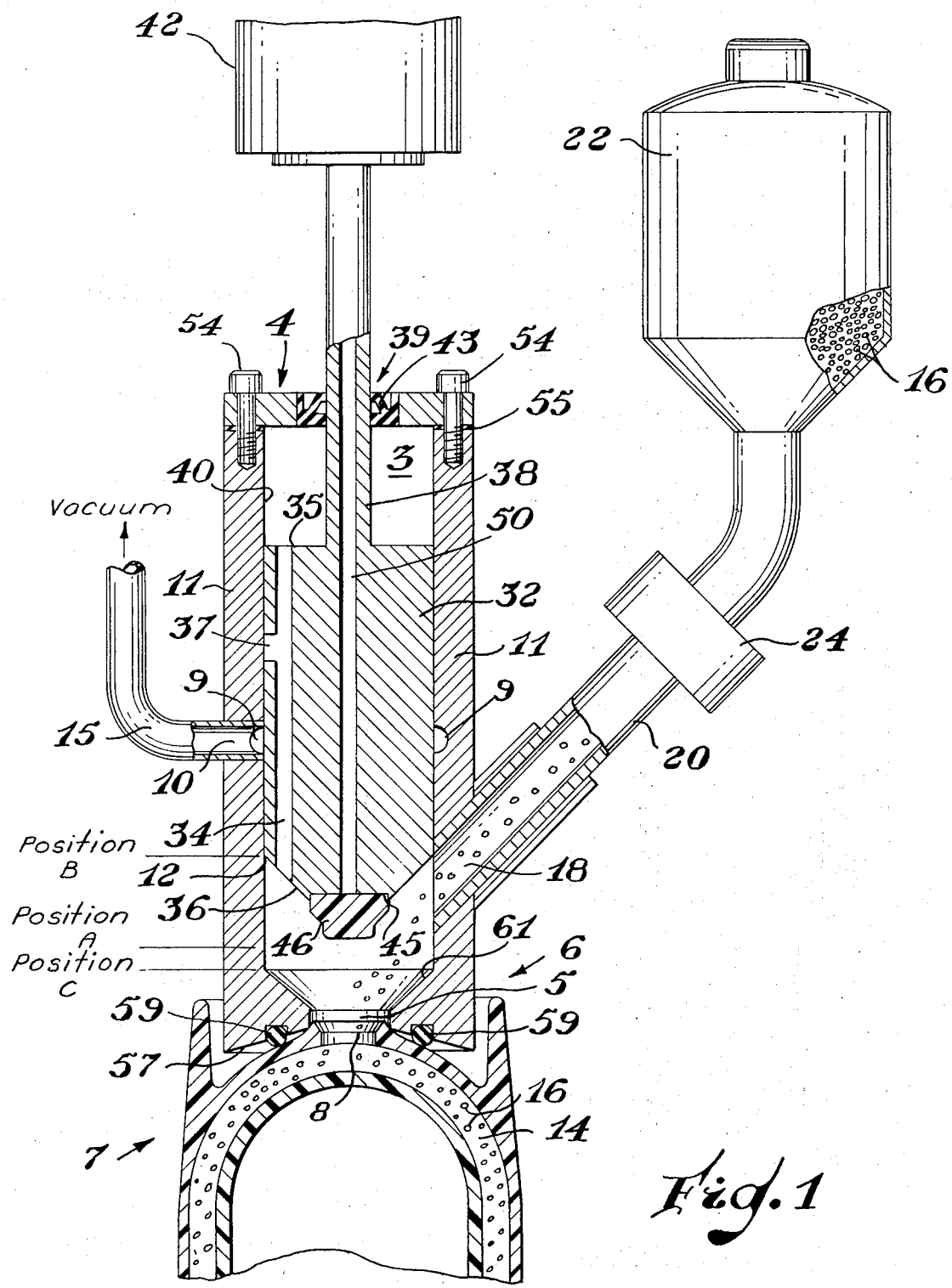
FIG. 1 is a vertical sectional view of one embodiment of the apparatus as employed in vacuumizing and filling a plastic vacuum bottle.

With reference to FIG. 1, the invention is shown as an apparatus for filling under vacuum the enclosed space of a plastic bottle having a double wall construction with a gas-absorbing particulate solid. Accordingly, the apparatus of FIG. 1 has a generally upright body defining cylindrical chamber 3 having an aperture 5 at the lower end 6 thereof for receiving an open end 8 of the plastic bottle 7. Only a fragmentary cross-section of the lower portion of the bottle 7 is shown. A groove 9 is circumferentially disposed in sidewall 11 of chamber 3. An outlet 10 in the sidewall of the chamber 3 opens into groove 9 which is or can be put in communication with an evacuating tube 15. An inlet 18 in the sidewall of the chamber 3 can be put in communication through a conduit 20 with a receptacle 22 represented in fragmentary cross-section which holds the particulate solid 16 under vacuum. Advantageously placed in the conduit 20 is a metering means 24 for supplying a measured amount or a shot of the solid 16 into the open end 8 of bottle 7 when inlet 18 into the chamber 3 is open. A reciprocating valve assembly for opening and closing outlet 10 and inlet 18 in sequence is slidably disposed lengthwise within chamber 3. The valve assembly has a piston 32 having a secondary passageway 34 disposed therein which traverses from end 35 to end 36 and a branch passageway 37 communicating between said secondary passageway 34 and the inside surface 40 of chamber 3. Rod 38 which is disposed in coaxial alignment with the longitudinal axis of the chamber 3 extends from piston 32 through a port 39 in the end plate 4 of the chamber 3 to connect the piston 32 with a means 42 capable of reciprocating and rotating the piston 32. End plate 4 is rigidly affixed to chamber 3, e.g., by screws 54. A gasket 55 is inserted between end plate 4 and chamber 3. A vacuum seal 43 is mounted in the port 39 such that the seal 43 bears circumferentially on rod 38. Centered in end 36 of piston 32 is a hexagonal socket 45 for holding a hexagonal thermoplastic plug 46 to be used for sealing the bottle after vacuumization and filling. The socket 45 is in communication with a vacuum pump through a main passageway 50 centrally disposed lengthwise in the piston 32 and rod 38. The outer surface 57 of the lower end 6 of the chamber 3 is advantageously shaoed to conform to the shape of the bottle 7. As depicted, the outer surface 57 is preferably beveled to conform to the shape of bottle 7. An O-ring 59 or similar gasket, usually of rubber or another elastomeric material, is affixed to surface 57 such that the O-ring 59 circumscribes opening 5 and will form a temporary, substantially hermetic seal with the bottle 7 when said bottle is pressed into contact therewith.

The inner surface 61 of said lower end 6 is advantageously sloped downward from the inner surface 40 of sidewall 11 to the opening 5 to facilitate flow of the particulate solid 16 into the open end 8 of bottle 7. End 36 of piston 32 is correspondingly beveled so that the piston 32 is completely seated in the lower end 6 when lowered to position C.

In operation, the thermoplastic stopper 46 is inserted in the socket 45 while the point 12 on piston 32 is in position C. A stopper 46 is held in place by wedging or otherwise clamping the stopper 46 fairly securely into the socket 45 and by evacuating main passageway 50. The open end 8 of bottle 7 is inserted in aperture 5, and the bottle 7 is urged into conforming contact with the O-ring 59. After the piston 32 is moved to position A, the secondary passageway 34 is in communication with evacuating tube 15. Thus, the chamber 3 and enclosed space 14 of the bottle 7 are evacuated. The point 12 on piston 32 is moved to position B, as depicted in FIG. 1, to terminate communication between the secondary passageway and the evacuating tube 15 and to open communication between the metering means 24 and the open end 8 of the bottle 7. A desired amount of particulate solid 16 is conveyed into enclosed space 14 by gravity flow of the solid. The point 12 on piston 32 is moved to position C thereby terminating communication between the metering means 24 and open end 8. In position C, the stopper 46 is inserted into the open end 8 and bears on the part of bottle 7 circumscribing open end 8. Preferably, the stopper 46 is beveled as is said part of bottle circumscribing the opening so that essentially all of the beveled surface of the stopper contacts and thereby is completely seated on the beveled surface circumscribing open end 8 of bottle 7. The piston 32 is rotated sufficiently to heat and fuse the contacting surfaces of the stopper and bottle such that a hermetic seal between enclosed space 14 and the atmosphere is formed. The finished vacuum bottle is removed from the apparatus by releasing the vacuum in passageway 50 and gently withdrawing the bottle from the apparatus.

As an additional step in the foregoing operation, complete retention of vacuum is assured by moving the piston from position B to position A and evacuating the chamber 3 and enclosed space 14 a second time before moving the piston to position C.

Figure 2:
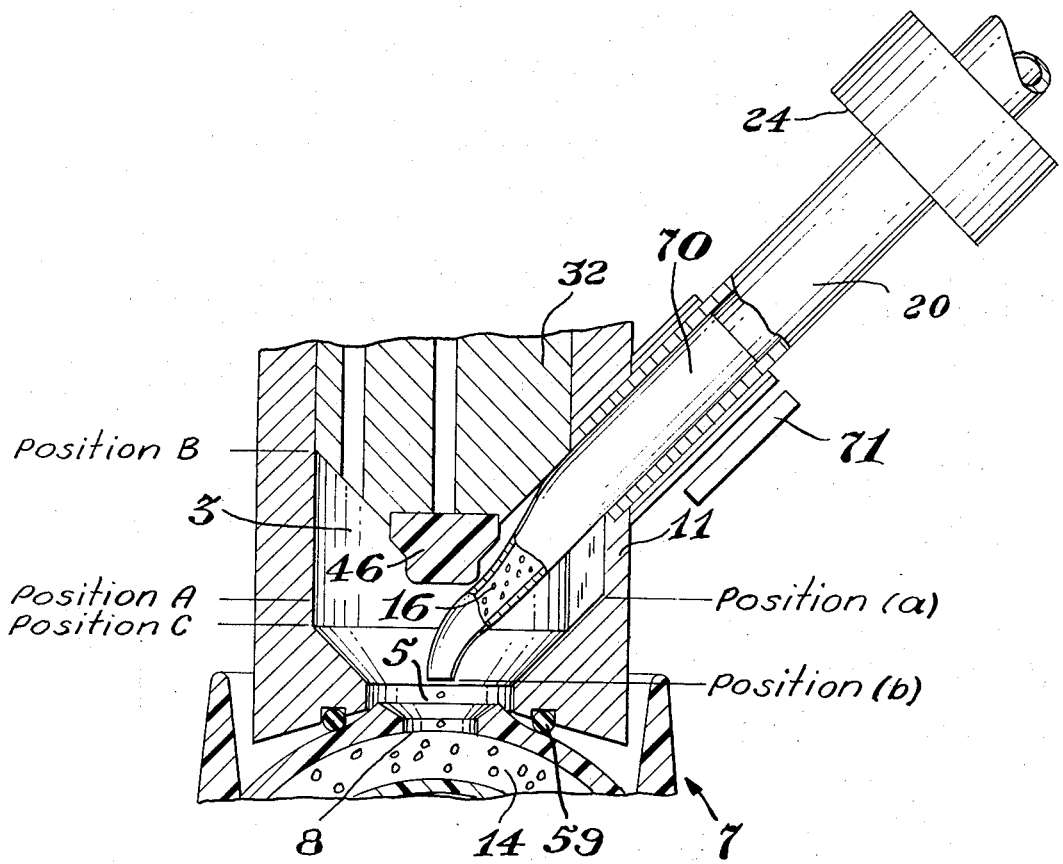
FIG. 2 is a vertical sectional view of a preferred means for conveying material into the vacuumized container.

With reference to FIG. 2, there is shown a preferred means for conveying particulate solid or other material into the open end 8 of bottle 7. Specifically, a funnel member 70 is slidably mounted in conduit 20 for reciprocation from a position (a) in the sidewall 11 of the chamber 3 to a position (b) directly above the open end 8 of bottle 7. As the piston 32 moves from position A to position B, the funnel member 70 moves from position (a) to position (b). The funnel member 70 is advantageously moved from position (a) to position (b) by magnetic means 71 located outside conduit 20. In such a case the material used in construction of the conduit 20 and chamber 3 is non-magnetic metal such as brass and the funnel member is constructed of magnetic material such as iron or magnetic steel. The particulate solid is then released from the metering means 24 and is conveyed by the conduit 20 and funnel member 70 into the open end 8 of bottle 7. After filling is completed, the funnel member is returned to position (a) and the sealing operation is begun as described hereinbefore.

In addition to bottles of the type as depicted in FIG. 1, it is possible to fill under vacuum containers of a wide variety of shapes and sizes including other containers of double wall construction such as jugs, insulated liquid and food servers, picnic chests and the like wherein the space enclosed between the walls is filled with gas absorbing material such as activated charcoal, metallic barium and other similar finely divided materials. Also, the apparatus of the present invention may be employed to package under vacuum a wide variety of liquid and solid items such as foods and medicines in plastic containers.

The plastic container may be fabricated of any structural plastic, e.g., polyethylene, polystyrene and others as disclosed in copending application Ser. No. 305,451, or combination thereof with other metallic materials including laminate structures similar to those described in the aforementioned copending application. The stopper employed to seal the container may comprise a material similar to the aforementioned plastic material or may comprise a metal or laminate thereof with plastic material.

In addition to the spin welding described as the sealing technique in description of FIG. 1, the stopper may be sealed in the open end of the container with various glues or adhesives such as resins. In such case, the piston of the valve assembly need not be rotatable. Also, sealing may be effected by vibrating the piston, e.g., with an ultrasonic vibrating means. Alternatively, sealing can be effected without the use of a stopper such as by pinching the open end of the container until it is closed. For example, the open end may be a tube which can be readily pinched and/or twisted and heated to form hermetic seal.

Other inherent advantages and analogous embodiments will readily occur to those skilled in the art. Accordingly, the extent of the invention is intended to be limited only by the scope of the appended claims.

What is claimed is:

1. An apparatus for filling a thermoplastic container with a material under vacuum and then sealing the container comprising:
   1. a body defining a chamber and having an outlet and an inlet in communication with said chamber and an aperture at one end of body for receiving at least the portion of the container having an open end through which the container is to be filled with material, said open end being in communication through said aperture with said chamber;
   2. a reciprocating valve assembly for opening and closing said inlet and outlet in sequence, said valve assembly being slidably disposed lengthwise within said chamber and comprising (a) a piston having a passageway disposed therein communicating between the end of the piston nearest said aperture and the inside sidewall of said body and (b) a shaft connecting said piston to a drive means;

3. an evacuating means in communication through a first conduit with the outlet in the chamber;
4. a receptacle holding the material under vacuum in communication through a second conduit with said inlet into the chamber; and
5. a sealing means located in the chamber proximate to said aperture;

whereby in operation, while maintaining said material under vacuum at all times, the open end of said container is placed in said aperture, communication between said passageway and the evacuating means is established, the chamber and container are evacuated by activating the evacuating means, the piston is moved until communication between said passageway and said evacuating means is terminated and communication between said second conduit and the open end of said container is opened, a desired amount of the material is conveyed into the evacuated container, the piston is moved to terminate communication between the second conduit and the container, and the sealing means is activated to hermetically seal the open end of said container, and the finished container is removed from the chamber.

2. An apparatus for filling a thermoplastic container with a material under vacuum and then sealing the container comprising:
1. a body defining a chamber and having an outlet and an inlet in communication with said chamber and an aperture at one end of body for receiving at least the portion of the container having an open end through which the container is to be filled with material, said open end being in communication through said aperture with said chamber;
2. a reciprocating valve assembly for opening and closing said inlet and outlet in sequence, said valve assembly being slidably disposed lengthwise within said chamber and comprising (a) a piston having a passageway disposed therein which traverses from one end of the piston to the other end and a branch passageway communicating between said passageway and the inside sidewall of the chamber and (b) a shaft connecting said piston to a drive means;
3. an evacuating means in communication through a first conduit with the outlet in the chamber;
4. a receptacle holding the material under vacuum in communication through a second conduit with said inlet into the chamber; and
5. a holder for a thermoplastic stopper rigidly mounted on the piston on the end nearest said aperture; whereby in operation the thermoplastic stopper is placed in the holder and the open end of the container is placed in the aperture, communication is established between the branch passageway and the evacuating means, the chamber and container are evacuated by activating the evacuating means, the piston is moved until the communication between the branch passageway and the evacuating means is terminated and communication between the receptacle and the open end of the container is opened, a desired amount of the material is conveyed from the receptacle into the evacuated container, the piston is moved to terminate communication between the receptacle and the container and to insert and hermetically seal the stopper in the open end of the container, and the finished container is removed from the chamber.

3. The apparatus of claim 2 in which the body defines a cylindrical chamber and a rotatable piston wherein after the piston is moved so that the stopper is inserted into the open end of the container, the piston is rotated until the stopper is spin welded to the container.

4. The apparatus of claim 3 wherein the material is conveyed from the receptacle to the container through a metering means that releases only the desired amount of material when communication between the container and the second conduit is opened.

5. The apparatus of claim 4 wherein the material is conveyed into the open end of the container by a funnel member slidably mounted in the second conduit and capable of being moved to a position directly above the open end of the container as the material is released from the metering means.

* * * * *